United States Patent [19]

Wienecke

[11] 4,344,972

[45] Aug. 17, 1982

[54] HERBAL CENTER DROP AND PROCESS FOR ITS PREPARATION

[75] Inventor: Horst Wienecke, Gross-Gerau, Fed. Rep. of Germany

[73] Assignee: Richardson GmbH, Gross-Gerau, Fed. Rep. of Germany

[21] Appl. No.: 152,698

[22] Filed: May 23, 1980

[30] Foreign Application Priority Data

Jun. 21, 1979 [DE] Fed. Rep. of Germany ....... 2925229

[51] Int. Cl.³ .......................... A23G 3/00; A23L 1/221
[52] U.S. Cl. .................................... 426/103; 426/281; 426/660
[58] Field of Search ............... 426/103, 638, 639, 660, 426/281, 282

[56] References Cited

U.S. PATENT DOCUMENTS

| | | | |
|---|---|---|---|
| 51,914 | 1/1866 | Bieler | 424/358 |
| 93,209 | 8/1869 | Llado | 424/195 |
| 120,705 | 11/1871 | Brecht | 424/358 |
| 2,252,934 | 8/1941 | Lautmann | 426/282 |
| 3,060,033 | 10/1962 | Ermarkaryan | 426/638 |

FOREIGN PATENT DOCUMENTS

1346373  11/1962  France .................................. 426/638

OTHER PUBLICATIONS

Richmond, Walter; *Choice Confections*, Manufacturer Confectioner Publishing Co.; ©1954, pp. 104–111.

*Primary Examiner*—Raymond N. Jones
*Assistant Examiner*—Elizabeth J. Curtin
*Attorney, Agent, or Firm*—George W. Rauchfuss, Jr.

[57] ABSTRACT

A bonbon with a hard coat and a core of viscous filling material containing ultra-fine comminuted herbal parts and a procedure for its preparation. The herbal parts especially may be those of camomile, peppermint, sage, and thyme.

3 Claims, No Drawings

HERBAL CENTER DROP AND PROCESS FOR ITS PREPARATION

FIELD OF THE INVENTION

The invention relates to bonbons with a herbal core, consisting of a hard bonbon coat and a core of a viscous filling material, characterized in that the filling material contains ultra-fine comminuted herbal parts, as well as a process for their preparation.

BACKGROUND OF THE INVENTION

Bonbons with herbal flavor, consisting either only of a hard bonbon material or of a soft core and a hard bonbon coat are known.

The bonbons consisting of a soft core and a hard bonbon coat have up to now been prepared by preparing a tea-like aqueous extract from the herbs whose aroma and effect were desired, sifting off the solids, concentrating the extract and then mixing it with the basic compound for the filling material and the filler, respectively, for example, honey, glucose syrup, and/or malt extract. Such a manner of preparation necessitates, however, to tediously concentrate the herbal extract, combined with relatively expensive equipment and a loss of flavor and effective substances.

A further method consists in mixing the filling material with ethereal oils or extracts of the desired herbs. For a multitude of herbs, particularly camomile, sage, and thyme, this process did not result in the desired natural fresh flavor of the bonbons.

The object of the invention was to provide a herbal bonbon with natural fresh flavor which could be prepared in a simple manner.

SUMMARY OF THE INVENTION

This problem was solved by a bonbon with a herbal core consisting of a hard bonbon coat and a core of a viscous filling material, characterized in that the filling material contains ultra-fine comminuted herbal parts, and a process for its preparation, characterized in that ultra-fine communited herbal parts are added to the viscous filling material at 85° to 120° C. and the mixture, after a short period of cooling down to a feeding-in temperature of about 80° to 95° C. is immediately pumped in known manner into the hard bonbon coat.

DETAILED DESCRIPTION OF THE INVENTION

The bonbons with a herbal core according to the invention have an exceptional fresh, natural herbal flavor.

This manner of solution was insofar surprising as not only from the experts but also from the customers existed a pronounced prejudice against the "sucking of tea parts."

First experiments to work such herbal parts into the used amounts of hard bonbons met with failures also insofar as when sucking these parts irritations of the mucuous membranes of the mouth were caused. Contrary thereto, when worked into a soft core no irritations could be ascertained.

The process for the preparation, when compared to the above described process for preparing herbal extracts, has aside from the already mentioned improvement in flavor the advantage that with regard to the amount of time and equipment spent it is substantially more economical.

As filling material that may be used there may be mentioned, for example, glucose syrup, honey, or malt extract or mixtures thereof.

The minimal amount of herbal parts should be about 0.8% by weight calculated on the filling material.

The particle size should be smaller than 1.0 mm.

Before adding the herbal parts to the filling material, the latter is heated to about 118° to 120° C. The herbal parts are added between 85° and 120° C., preferably at 115° to 116° C. Within this temperature range, the aromatic substance of the herbal parts on the one hand are optimally liberated, on the other hand, however, not destroyed. The water content of the compound amounts to about 12% by weight.

The herbal parts are added at the above mentioned temperature, however without further heating, that is, practically during the cooling off period. After a short cooling off to about 80° to 95° C. the compound containing the herbal parts is thereafter continuously pumped into the hard bonbon coat. The time of residence from the addition of the herbal parts up to the feeding-in of the herbal filling material into the hard bonbon coat lasts about ½ to ¾ of an hour. For pumping-in the conventional devices are used.

The herbal compound is prepared in small portions to enclose steadily the liberated aromatic substances with the hard bonbon coat and to so preserve the fresh flavor.

For the herbal parts all herbs can be used which contain ethereal oils and are capable of liberating the flavor and effective substances, respectively, like, for example, camomile, peppermint, sage, and thyme.

The bonbons with a herbal core are preferably used as cough drops.

As ultra-fine comminuted herbal parts, for example, the commercially obtainable blossoms or peppermint leaves as finely cut drug, both in DAB-quality, can be used. They can be also comminuted on the spot with the suitable equipment.

As material for the hard bonbon coat any bonbon material suitable for this purpose can be used. To the coat itself ethereal oils and aromatic substances of the various desired herbs can be added.

I claim:

1. A process for preparing bonbons with a herbal core comprising the steps of adding ultra-fine comminuted herbal parts having a particle size smaller than 1.0 mm, in an amount sufficient to impart a herbal flavor, to a viscous filling material having a temperature of 85° to 120° C., to form a mixture; cooling the mixture to a temperature of about 80° to 95° C.; and, pumping said mixture into a hard bonbon candy coat.

2. The bonbon produced by the process of claim 1.

3. The bonbon of claim 2 wherein the herbal parts are selected from the group consisting of camomile, peppermint, sage and thyme.

* * * * *